US012670065B2

(12) United States Patent
Eno et al.

(10) Patent No.: US 12,670,065 B2
(45) Date of Patent: Jun. 30, 2026

(54) ADAPTIVE PARITY TECHNIQUES FOR A MEMORY DEVICE

(71) Applicant: Micron Technology, Inc., Boise, ID (US)

(72) Inventors: Justin Eno, El Dorado Hills, CA (US); William A. Melton, Shingle Springs, CA (US); Sean S. Eilert, Penryn, CA (US)

(73) Assignee: Micron Technology, Inc., Bosie, ID (US)

( * ) Notice: Subject to any disclaimer, the term of this patent is extended or adjusted under 35 U.S.C. 154(b) by 38 days.

(21) Appl. No.: 18/733,319

(22) Filed: Jun. 4, 2024

(65) Prior Publication Data

US 2024/0362115 A1    Oct. 31, 2024

Related U.S. Application Data

(63) Continuation of application No. 17/861,013, filed on Jul. 8, 2022, now Pat. No. 12,026,051, which is a
(Continued)

(51) Int. Cl.
*G06F 11/00* (2006.01)
*G06F 11/07* (2006.01)
(Continued)

(52) U.S. Cl.
CPC ........ *G06F 11/1068* (2013.01); *G06F 11/073* (2013.01); *G06F 11/076* (2013.01);
(Continued)

(58) Field of Classification Search
CPC .. G06F 11/1068; G06F 11/073; G06F 11/076; G06F 11/0772; G06F 11/1064; G06F 11/3037; G06F 11/1032
See application file for complete search history.

(56) References Cited

U.S. PATENT DOCUMENTS 7,890,836 B2    2/2011 Eilert
10,033,411 B2    7/2018 Motwani
(Continued)

FOREIGN PATENT DOCUMENTS

CN    109725845 A    5/2019

OTHER PUBLICATIONS

Chinese Patent Office, "Office Action," issued in connection with Chinese Patent Application No. 202110923797.2 dated Dec. 22, 2025 (23 pages) (12 pages of English Translation and 11 pages of Original Document).

*Primary Examiner* — Joseph D Manoskey
(74) *Attorney, Agent, or Firm* — Holland & Hart LLP

(57) ABSTRACT
Methods, systems, and devices for adaptive parity techniques for a memory device are described. An apparatus, such as a memory device, may use one or more error correction code (ECC) schemes, an error cache, or both to support access operations. The memory device may receive a command from a host device to read or write data. If the error cache includes an entry for the data, the memory device may read or write the data using a first ECC scheme. If the error cache does not include an entry for the data, the memory device may read or write the data without using an ECC scheme or using a second ECC scheme different than the first ECC scheme.

20 Claims, 8 Drawing Sheets

Related U.S. Application Data continuation of application No. 16/993,959, filed on Aug. 14, 2020, now Pat. No. 11,385,961.

(51) Int. Cl.
　　*G06F 11/10*　　　　(2006.01)
　　*G06F 11/30*　　　　(2006.01)

(52) U.S. Cl.
　　CPC ...... *G06F 11/0772* (2013.01); *G06F 11/1064* (2013.01); *G06F 11/3037* (2013.01)

(56)　　　　　　References Cited

U.S. PATENT DOCUMENTS

| | | |
|---|---|---|
| 11,138,055 B1 | 10/2021 | Chalfant et al. |
| 2003/0115437 A1 | 6/2003 | Tomita |
| 2017/0046221 A1 | 2/2017 | Bandic et al. |
| 2017/0123903 A1 | 5/2017 | Eguchi |
| 2018/0267853 A1 | 9/2018 | Saida et al. |
| 2018/0302105 A1 | 10/2018 | Kalamatianos et al. |
| 2019/0006001 A1* | 1/2019 | Chun .................... G06F 11/073 |
| 2019/0129654 A1 | 5/2019 | Kim |
| 2020/0081771 A1 | 3/2020 | Kalamatianos et al. |
| 2020/0183826 A1 | 6/2020 | Beaudoin et al. |
| 2020/0219580 A1 | 7/2020 | Khan et al. |
| 2021/0173737 A1 | 6/2021 | Ware |

\* cited by examiner

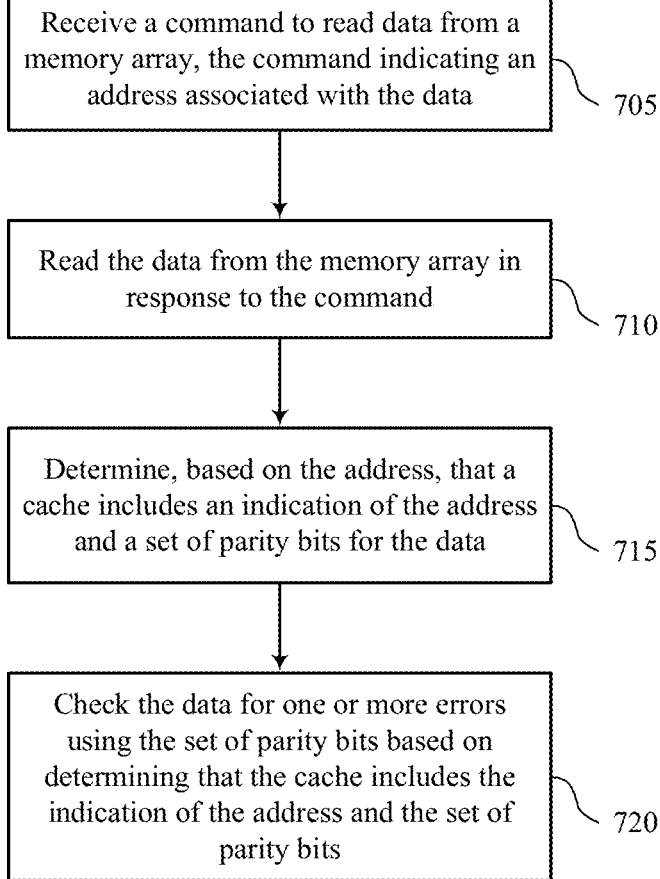

Receive a command to read data from a memory array, the command indicating an address associated with the data

705

Read the data from the memory array in response to the command

710

Determine, based on the address, that a cache includes an indication of the address and a set of parity bits for the data

715

Check the data for one or more errors using the set of parity bits based on determining that the cache includes the indication of the address and the set of parity bits

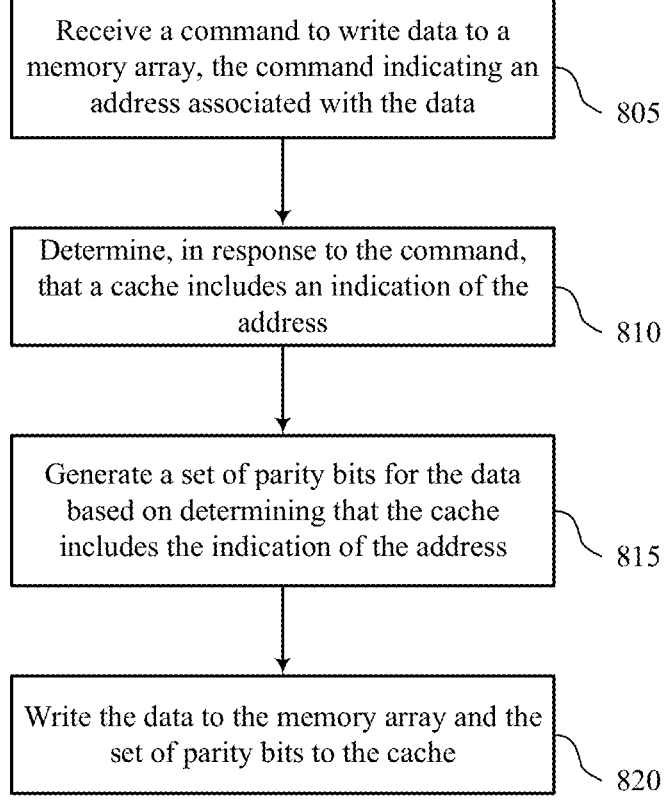

Receive a command to write data to a memory array, the command indicating an address associated with the data

805

Determine, in response to the command, that a cache includes an indication of the address

810

Generate a set of parity bits for the data based on determining that the cache includes the indication of the address

815

Write the data to the memory array and the set of parity bits to the cache

ADAPTIVE PARITY TECHNIQUES FOR A MEMORY DEVICE

CROSS REFERENCE

The present application for patent is a continuation of U.S. patent application Ser. No. 17/861,013 by Eno et al., entitled "ADAPTIVE PARITY TECHNIQUES FOR A MEMORY DEVICE," filed Jul. 8, 2022, which is a continuation of U.S. patent application Ser. No. 16/993,959 by Eno et al., entitled "ADAPTIVE PARITY TECHNIQUES FOR A MEMORY DEVICE," filed Aug. 14, 2020, each of which is assigned to the assignee hereof, and each of which is expressly incorporated by reference in its entirety herein.

BACKGROUND

The following relates generally to one or more systems for memory and more specifically to adaptive parity techniques for a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

BRIEF DESCRIPTION OF THE DRAWINGS

FIGS. 7 and 8 show flowcharts illustrating a method or methods that support adaptive parity techniques for a memory device in accordance with examples as disclosed herein.

DETAILED DESCRIPTION

Figure 1:
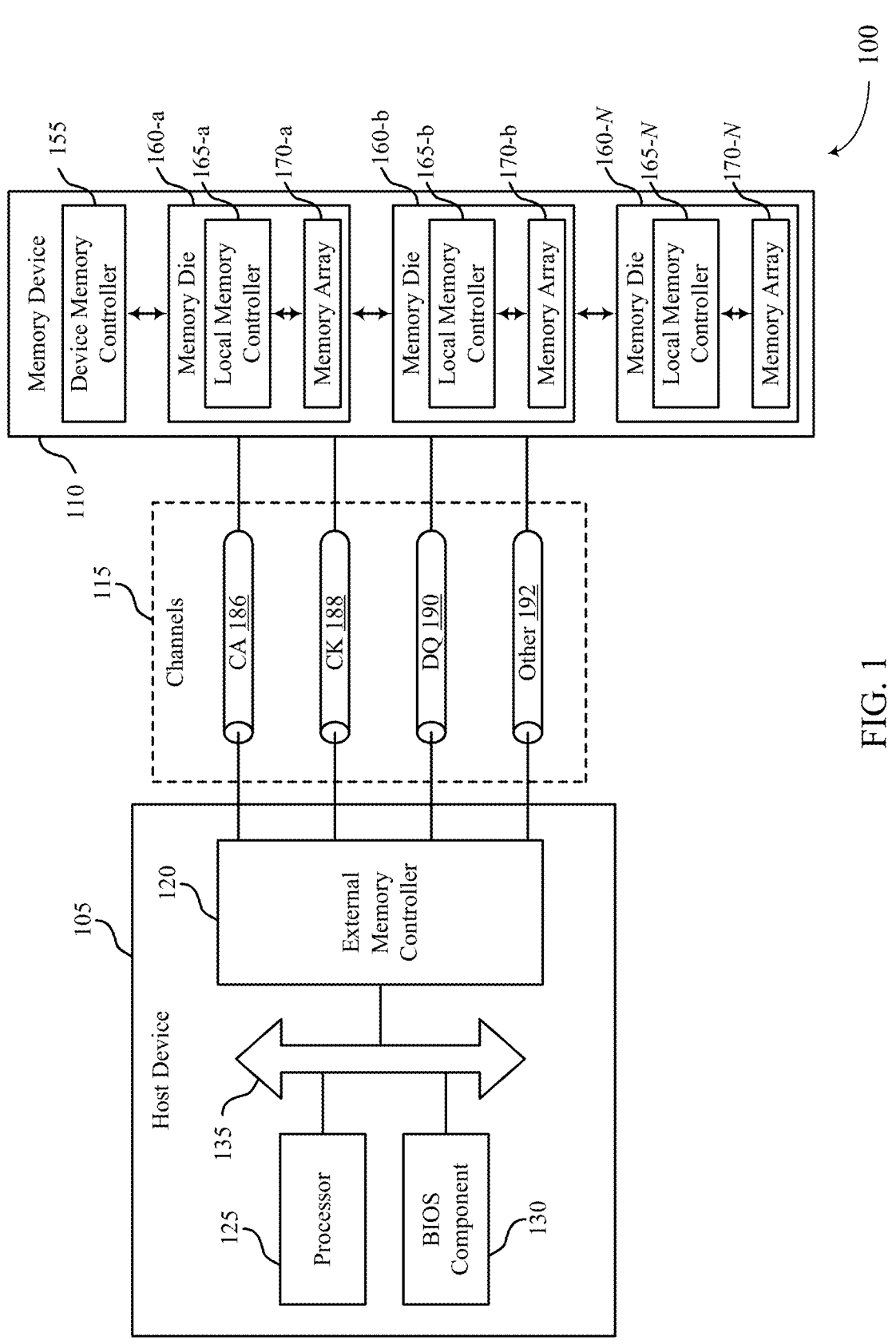
FIG. 1 illustrates an example of a system that supports adaptive parity techniques for a memory device in accordance with examples as disclosed herein.

Some memory systems may utilize error detection or correction techniques, which may generally be referred to as error checking techniques, to detect or correct errors in data retrieved from a memory array. For example, a memory system may implement error checking techniques (e.g., a parity scheme) to determine whether data was corrupted while stored in a memory array, and in some cases may attempt to correct detected errors. However, a given error checking technique may be limited to detecting or correcting up to a certain quantity of errors (at least with a certain level of reliability). For example, a single error correction (SEC) scheme may be able to detect and correct a single error in a set of data, and a SEC double error detection (DED) scheme may be able to detect up to two errors and correct one error in a set of data, among other examples of parity schemes. In some cases, data may include errors above the quantity of correctable or detectable errors for an error checking scheme (e.g., a SECDED scheme may be unable to reliably detect or correct three errors in a set of data, among other examples of quantities and schemes).

The techniques described herein may enable a memory system to implement adaptive parity schemes for error correction, which may result in relatively more robust error checking techniques while mitigating an increase processing or storage overhead, or both, among other advantages. Some errors associated with a memory array may be fixed (e.g., due to a memory cell being defective, such as being "stuck" storing a certain logic state), while other errors may be time-variant (e.g., due to transient conditions such as temperature or electromagnetic effects, such that an associated memory cell may not in fact be defective). A memory device may include or otherwise have access to a cache, which may be referred to as an error cache and may be managed (e.g., populated and culled or otherwise have its entries maintained) so as to include indications of memory cells associated with fixed errors and not include (e.g., cull over time) indications of memory cells associated with time-variant errors. A memory device may use the error cache to select a parity scheme for a set of data based on whether a set of memory cells at which the data is written to or read from is indicated by the cache as including one or more defective memory cells. Thus, a more robust parity scheme may be selected and used for the data if the error cache includes such an indication, and a less robust parity scheme (or no parity scheme) may be selected and used for the data if the error cache includes no such indication.

In some examples, the memory system may consult an error cache in support of a read operation. As an illustrative example, a memory system may receive, from a host system, a command to read data from a memory array. The command may indicate an address of the data in the memory array. The memory system may read the data and search the error cache for an entry associated with the command. Such entries may include an indication of the address and a set of parity bits. The memory system may check the data for one or more errors using one or more ECC schemes based on whether the error cache includes the entry. For example, if the cache includes an entry for the address, the memory device may check the data using a first ECC scheme (e.g., using a set of parity bits stored in the error cache, a set of parity bits stored in the memory array, or a combination thereof). Such a scheme may be relatively more robust, which may improve error correction and detection capabilities for addresses that are relatively likely to include errors. As another example, if the cache lacks an entry for the address, the memory array may check the data using a second ECC scheme (or in some cases may forego error checking for the data). The second ECC scheme may, for example, be a default or relatively less robust parity scheme (e.g., using a set of parity bits stored in the memory array, or other error checking techniques that do not use parity bits). Using the default scheme for addresses not included in the cache may reduce processing overhead (e.g., use less parity bits) and may use relatively less storage space for addresses that are relatively unlikely to include errors, among other advantages.

Additionally or alternatively, the memory system may consult an error cache in support of a write operation. For example, the memory system may determine whether the error cache includes one or more entries for an address of the data. If the error cache lacks an entry for the address, the memory system may use no ECC scheme (e.g., the memory system may refrain from generating parity bits for the data) or a default, relatively less robust ECC scheme (e.g., the memory system may generate a quantity of parity bits of the second ECC scheme) and write the data and/or the parity bits to the memory array. If the error cache includes one or more entries for the address, the memory system may use a relatively more robust ECC scheme. For example, the memory system may generate a relatively higher quantity of parity bits, and in some cases store at least a portion of the parity bits in the error cache, when the error cache includes one or more entries for the address.

Features of the disclosure are initially described in the context of systems and dies as described with reference to FIGS. 1 and 2. Features of the disclosure are described in the context of memory systems and process flows as described with reference to FIGS. 3-5. These and other features of the disclosure are further illustrated by and described with reference to an apparatus diagram and flowcharts that relate to adaptive parity techniques for a memory device as described with reference to FIGS. 6-8.

FIG. 1 illustrates an example of a system 100 that supports adaptive parity techniques for a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105.

Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any number of signal paths to decode one or more of address or command data (e.g., eight or nine signal paths).

In some examples, data channels 190 may be operable to communicate one or more of data or control information between the host device 105 and the memory device 110. For example, the data channels 190 may communicate information (e.g., bi-directional) to be written to the memory device 110 or information read from the memory device 110. In some examples, the one or more other channels 192 may include one or more error detection code (EDC) channels. The EDC channels may be operable to communicate error detection signals, such as checksums, to improve system reliability. An EDC channel may include any quantity of signal paths.

In some examples, bit errors may occur due to memory cell defects (e.g., from manufacturing flows, latent defects that occur after manufacturing, etc.). For example, a memory cell may include a defect resulting in a fixed error (e.g., a memory cell may be defective), or a detected error in a memory cell may be a time-variant error (e.g., a relatively functional memory cell may include a random error due to operating conditions or other random circumstances).

An error checking technique may be able to detect or correct up to a certain quantity of errors in data written to and subsequently read from a memory array based on parity information generated for the data, which in some cases may also be stored in the memory array (e.g., in association with the corresponding data). For example, an SEC parity scheme may support detecting or correcting a single error in data based on the parity information for the data, a SECDED parity scheme may support detecting up to two errors and correcting a single error based on the parity information for the data, among other examples of error detection schemes. In some cases, data may include errors above the quantity of errors that may be corrected based on the associated parity information.

As described herein, a system 100 may implement adaptive parity schemes for error correction, which may result in relatively more robust error checking techniques while mitigating associated processing overhead or storage overhead, or both, among other advantages. For example, one or more components of the system 100 (e.g., a memory device 110, a host device 105, a device memory controller 155, a local memory controller 165, an external memory controller 120, or any combination thereof) may maintain an error cache in order to provide information for error correction to an error correction engine, as described herein, including for example with reference to FIGS. 3-5.

The memory device 110 may perform access operations using an error cache in accordance with one or more parity schemes. The memory device 110 may store entries in the error cache for one or more addresses of a memory array 170. For example, the memory device 110 may detect an error at an address and update the error cache to include an indication of the address and one or more parity bits (e.g., the error cache may include a list of addresses that are relatively likely to include errors based on previous error detection operations).

In some examples, the memory device 110 may support one or more ECC schemes (e.g., parity schemes) and may select or identify an error scheme for a given set of data using the error cache. As an illustrative example, a memory device 110 may receive, from a host system, a command to read data from a memory array 170. The command may indicate an address of the data in the memory array 170. The memory device 110 may read the data and search an error cache for an entry associated with the command. Such entries may include an indication of the address and a set of parity bits. The memory device 110 may check the data for one or more errors using one or more parity schemes based on whether the error cache includes the entry. For example, if the cache includes an entry for the address, the memory array may check the data using a first scheme (e.g., using a set of parity bits stored in the error cache, a set of parity bits stored in the memory array 170, or a combination thereof). Such a scheme may be relatively more robust, which may improve error correction and detection capabilities for addresses that are relatively likely to include errors. As another example, if the cache lacks an entry for the address, the memory device 110 may check the data using a first scheme, such as a default parity scheme (e.g., using a set of parity bits stored in the memory array 170, or other error checking techniques). Using the default memory scheme for addresses not included in the cache may reduce processing overhead (e.g., use less parity bits) and use relatively less storage space for addresses that are relatively less likely to include errors, among other advantages. Additionally or alternatively, the memory device 110 may receive a command to write data to an address and generate (or refrain from generating) parity bits in accordance with one or more ECC schemes as described herein.

Figure 2:
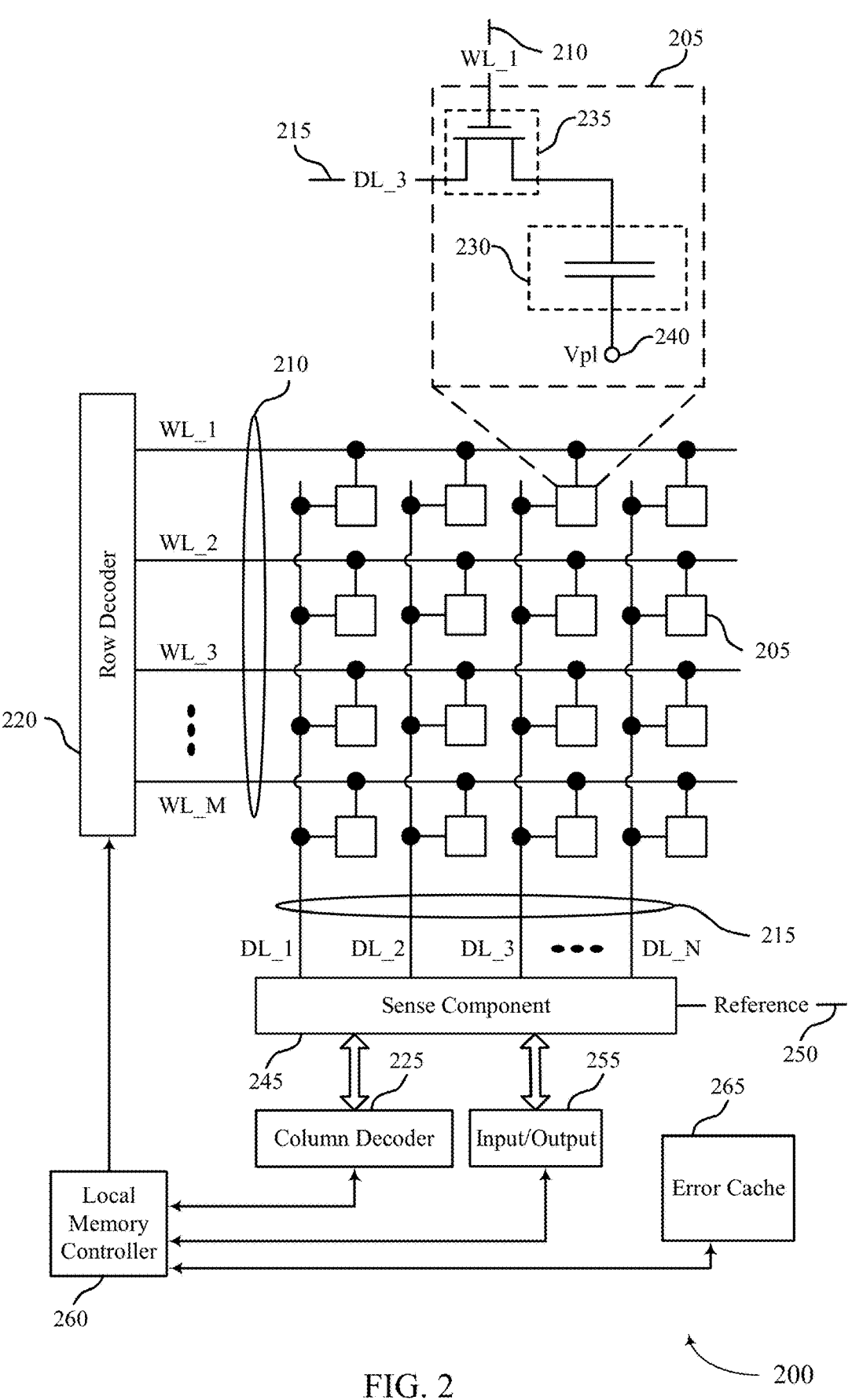
FIG. 2 illustrates an example of a memory die that supports adaptive parity techniques for a memory device in accordance with examples as disclosed herein.

FIG. 2 illustrates an example of a memory die 200 that supports error caching techniques for improved error correction in a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state.

The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The local memory controller 260 and the memory die 200 may include, be coupled with, or otherwise utilize an error cache 265 to support error correction for data stored in and read from the memory array. The error cache 265 may be coupled with the local memory controller 260 as shown in FIG. 2. Alternatively, in some cases the error cache 265 may be coupled with the local memory controller 260. And in some cases (e.g., where memory cells 205 are non-volatile), the error cache 265 may be or include a portion of the memory array.

The local memory controller 260 (or another controller of the memory device 110 or a host device 105) may maintain (e.g., manage) the contents of the error cache 265 in order to provide information for error correction, as described with reference to FIGS. 3-5, for example. The error cache 265 may be populated with one or more entries indicating addresses, and in some cases parity bits, associated with one or more defective memory cells of the memory die 200. For example, the local memory controller 260 may identify an error in data associated with an address, and the local memory controller 260 may write an indication of the address that includes the identified error to the error cache 265. Additionally or alternatively, the local memory controller 260 may generate a set of parity bits for a parity scheme and store the parity bits in the error cache 265 with the indication of the address.

The local memory controller 260 may consult the error cache 265 when performing various operations (e.g., access operations) and in support of one or more procedures for error correction or detection. For example, error checking logic (e.g., within the memory die 200) may use parity bits stored in the error cache 265, parity bits stored in the memory die 200, or a combination thereof to detect and/or correct a quantity of errors in data read from the memory array. The error checking logic may be or include one or more error correction engines 315 as described with reference to FIG. 3. The local memory controller 260 may consult the error cache 265 to select a parity scheme to use for a given set of data or identify a parity scheme previously selected for the set of data. In some cases, different parity schemes may correspond to different respective error correction engines 315.

As an illustrative example, the local memory controller 260 may receive, from a host system, a command to read data from a memory array. The command may indicate an address of the data in the memory array. The local memory controller 260 may read the data and search an error cache for an entry associated with the command. Such entries may include an indication of the address and a set of parity bits. The local memory controller 260 may check the data for one or more errors using one or more parity schemes based on whether the error cache includes the entry. For example, if the cache includes an entry for the address, the memory array may check the data using a first scheme (e.g., using a set of parity bits stored in the error cache, a set of parity bits stored in the memory array, or a combination thereof). Such a scheme may be relatively more robust, which may improve error correction and detection capabilities for addresses that are relatively likely to include errors. As another example, if the cache lacks an entry for the address, the local memory controller 260 may check the data using a first scheme, such as a default parity scheme (e.g., using a set of parity bits stored in the memory array, or other error checking techniques). Using the default memory scheme for addresses not included in the cache may reduce processing overhead (e.g., use less parity bits) and use relatively less storage space for addresses that are relatively less likely to include errors, among other advantages. Additionally or alternatively, the local memory controller 260 may receive a command to write data to an address and generate (or refrain from generating) parity bits in accordance with one or more ECC schemes as described herein.

Figure 3:
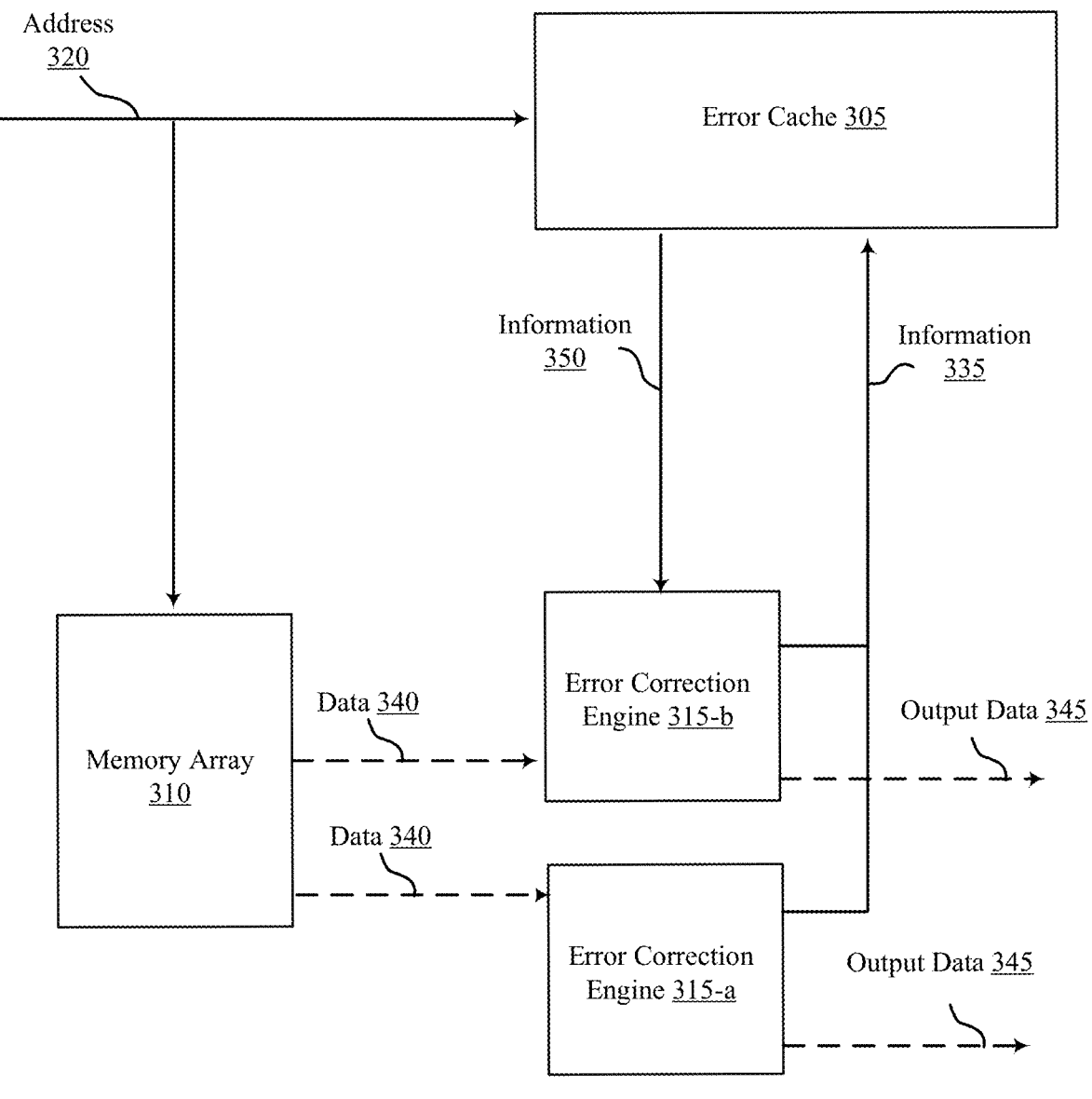
FIG. 3 illustrates an example of a system that supports adaptive parity techniques for a memory device in accordance with examples as disclosed herein.

FIG. 3 illustrates an example of a system 300 that supports adaptive parity techniques for a memory device in accordance with examples as disclosed herein. The system 300 may be an example of aspects of a system 100 or a memory device 110 as described with reference to FIGS. 1 and 2, respectively.

The system 300 may include a memory array 310, which may be an example of a memory array 170. The system 300 may also include error cache 305 and one or more error correction engines 315 (e.g., the error correction engine 315-b and the error correction engine 315-a). In some examples, the error correction engines 315 may alternatively be referred to as error checking circuits or error checking logic. The system 300 may be configured to perform one or more error checking procedures using the one or more error correction engines 315 and the error cache 305, which may reduce the chance of errors in communications (e.g., transmitting corrupted data from the memory array 310), mitigate associated processing or storage overhead of the system 300, or a combination thereof. Generally, the components shown in FIG. 3 may implement the procedures and operations described herein related to error checking, although it is to be understood that there may be more or less components than shown that implement the procedures. Additionally or alternatively, although illustrated as separate for illustrative clarity, the various components described herein may be combined or physically located differently than illustrated.

The error cache 305 may maintain a list of addresses of a memory array that are associated with previously detected errors (e.g., due to defective memory cells in the address). For example, the system 300 may detect errors in a page while reading data of an address. For instance, the system 300 may detect an error using a first ECC scheme (e.g., ECC1), such as a first parity scheme using a first quantity of parity bits. The system 300 may generate a second set of parity bits that includes a second, greater quantity of parity bits in accordance with a second ECC scheme (e.g., ECC2) based on detecting the error. The system 300 may store, in the error cache 305, an indication of the address and at least a portion of the generated second set of parity bits. As one illustrative example, for data associated with a storage location that has been determined to include one or more defective memory cells, the system 300 may store, in the error cache 305, twenty-eight (28) bits indicating an address and nine (9) parity bits of a generated eighteen (18) parity bits for the address in accordance with an ECC2 scheme, along with another nine (9) parity bits of the generated eighteen (18) ECC2 parity bits in the memory array 310, among other examples of quantities and storage schemes (e.g., the system 300 may store all of the generated ECC2 parity bits in the error cache 305, etc.). As another illustrative example, for data associated with a storage location for which no memory cells have been determined to be defective, the system 300 may implement an ECC1 scheme for an address and store the data and all nine (9) generated ECC1 parity bits in the memory array 310 (e.g., the error cache 305 may lack an entry for the address or associated parity bits). It is to be understood that these and any other specific numeric examples here are provided solely for the sake of illustrative clarity and are not limiting of the claims.

In general, the memory device may support N different parity schemes, where N is any value one or greater, and the memory device may generate and store parity bits, or a greater quantity of parity bits, for data written to an address associated with one or more memory cells previously identified as defective, and the memory device may not generate and store any parity bits, or may generate and store a lesser quantity of parity bits, for data written to an address for which no associated memory cells are identified as defective. They memory device thus may select and utilize a parity scheme and associate amount of overhead that is appropriate for a relative likelihood of an error being introduced to the data, based on historical information regarding whether errors are been previously detected in data from a set of memory cells at which the data is stored.

In some examples, the list of addresses may be generated based on ECC results or from testing done during one or more maintenance cycles, such as refresh cycles (e.g., the system 300 may perform a diagnostic procedure for the memory device during a refresh or other opportune period and the error cache 305 may be populated based on the results of the procedure). In some examples, information may be loaded to the error cache 305 upon powerup (e.g., in NVM, the list may be loaded to content addressable memory (CAM) or static RAM on powerup of the memory device).

The system 300 may receive a command, for example, from a host device. The command may indicate an address 320 associated with data (e.g., a logical address associated with the data or a physical address associated with a set of memory cells within the memory array 310 for writing or reading the data).

When a received command is a write command, the system 300 may store the data in the memory array 310. The system 300 may also check the error cache 305. If the error cache 305 includes an entry for the address 320, the system 300 may generate parity bits in accordance with a relative robust parity scheme and store at least a portion of the generated parity bits in the error cache 305 and/or the memory array 310. For example, in terms of the above-described illustrative example, the system 300 may generate eighteen (18) parity bits for an ECC2 scheme and store a first subset of nine (9) of the eighteen (18) parity bits in the memory array 310 (e.g., along with the write data) and second subset of nine (9) of the eighteen (18) parity bits in the error cache 305 (e.g., along with the indication of the address 320), although any quantity of bits, distribution of bits across the memory array 310 or the error cache 305, or ECC schemes may be used.

When a received command is a read command, a controller of the system 300 may perform a read operation to retrieve corresponding data 340 from the indicated address 320 of the memory array 310. In some examples, the system 300 may also read parity information for the data 340 (e.g., parity bits 355 previously generated based on the data 340) from the memory array 310. Additionally or alternatively, the system 300 may read a first set of parity bits from the error cache 305. For example, the system 300 may store a set of parity bits associated with the data (e.g., using a first ECC scheme) or a portion of a set of parity bits associated with the data (e.g., using a second ECC scheme relatively more robust than the first ECC scheme) in the memory array 310. The system 300 may query the error cache 305 to determine whether the error cache 305 includes an entry for the address 320. In response to the query, the error cache 305 may send information 350 to a corresponding error correction engine 315. For example, if the error correction engine 315-b is selected based on the error cache 305 including an entry for the address 320, the information 350 may include parity bits of a respective ECC scheme and the error cache 305 may send the parity bits to the error correction engine 315-b. The information 350 may include error correction information (e.g., parity bits of an ECC2 scheme) which may enable the error correction engine 315 to correct the quantity of errors.

The system 300 may perform error checking using one or more error correction engines 315. For example, the system 300 may use the error correction engine 315-b if the error cache 305 includes an indication of the address 320, and the system 300 may use the error correction engine 315-a if the error cache 305 lacks an indication of the address 320. The error correction engine 315-b may implement a relatively more robust ECC scheme than the error correction engine 315-a. In other words, the error correction engine 315-b may be configured to detect or correct a greater quantity of errors in the data compared to the error correction engine 315-a. For example, the error correction engine 315-b may use parity bits of an ECC2 scheme (e.g., a relatively higher quantity of parity bits, with a portion of the parity bits being stored in the error cache 305 and/or the memory array 310). Such a scheme may enable a higher chance of detecting or correcting errors in the data 340. The error correction engine 315-a may implement a relatively less robust but lower overhead ECC scheme. For example, the error correction engine 315-a may not use parity bits for the data 340, or may use a relatively smaller quantity of parity bits stored in the memory array 310. Such a scheme may reduce a processing overhead of the error correction engine 315-a, increase storage efficiency in the system 300, or both. Although shown with two error correction engines 315-b and two ECC schemes for illustrative clarity, it is to be understood that any quantity of error correction engines or ECC schemes may be used.

In some cases, an error correction engine 315 may identify no errors in the data 340. For example, the data 340 may be free of errors or a quantity of errors may exceed a detection capability of the error correction scheme (e.g., if using a SECDED scheme, the error correction engine 315 may identify no errors in the data 340 if the data 340 includes three or more errors). In such examples, the system 300 may transmit output data 345. In some other cases, the error correction engine 315 may identify a correctable quantity of one or more errors in the data 340 and may correct the one or more errors to obtain corresponding output data 345. For example, the error correction engine 315-b may identify a single error in a SEC or SECDED scheme and may correct the single error (e.g., flip a bit from a first logic state to a correct second logic state, the flipped bit identified using the parity bits of the scheme associated with the error correction engine 315-b) before outputting the output data 345, for example, to a host device requesting the data.

In some examples, an error correction engine 315 may send information 335 to the error cache 305. For example, if the error correction engine 315-a (e.g., using an ECC1 scheme) detects an error in a page of the memory array 310, the error correction engine 315-a may indicate the address 320 to the error cache 305. Additionally or alternatively, the system 300 may generate parity bits in accordance with a different ECC scheme (e.g., a relatively more robust ECC2 scheme for the error correction engine 315-b), for example, based on the detected error. An error correction engine 315 may indicate at least a portion of the parity bits to the error cache 305. As an illustrative example, if the system 300 switches from a second ECC scheme (e.g., with parity bits stored in the memory array 310) to a first ECC scheme (e.g., with parity bits stored in both the memory array 310 and the error cache 305), the error correction engine 315-b or the error correction engine 315-a may generate the parity bits and send a first portion (e.g., 9 bits) to the error cache 305 via information 335, and a second portion (e.g., 9 bits) to the memory array 310, although any quantity of engines, bits, and portions may be used.

The system 300 may maintain the error cache 305. For example, the system 300 may employ methods for testing cached error locations and continuously updating (e.g., adding or culling) the list of "bad" locations (e.g., addresses including defective memory cells), which may increase the efficiency of the error cache 305. An error correction engine 315 may determine one or more results of one or more error correction or detection procedures. The error correction engine 315 may send information 335 indicating the one or more results. In one illustrative example, the error correction engine 315-b may identify no errors in the data 340. If the error cache 305 includes an entry for the address 320, the information 335 may indicate to remove the entry based on identifying no errors. Such removal may result in more efficient cache utilization and remove entries of the error cache 305 that may not be a result of a fixed error (e.g., an indication of a page with errors may be stored previously based on identifying a time-variant error), which may reduce the chance of storing a relatively high quantity of parity bits for error-free data 340.

In some examples, the system 300 may remove an indication from the error cache 305 based on one or more thresholds. For example, the system 300 may increment a counter or otherwise track a quantity of times (e.g., consecutive times) that no errors are detected for an address 320 indicated by the error cache 305 as including errors. If the quantity of times that no errors are detected satisfies a threshold, the system 300 may remove the entry of the error cache 305 corresponding to the address 320. By updating the error cache 305 based on satisfying the threshold, the system 300 may cull entries of the error cache that may be associated with a time-variant error while avoiding culling entries based on coincidental error-free determinations (e.g., if a defective memory cell happens to be stuck in a state corresponding to a logic value written to the memory cell).

In some examples, if the error cache 305 already includes an entry for the address 320, the information 335 may indicate to increment an error count associated with the address 320 based on identifying the error. Writing, to the error cache 305, an indication that the address 320 includes errors (e.g., so as to determine whether to generate parity bits with a relatively more robust ECC scheme for the error correction engine 315-*b*) may be based on the incremented error count satisfying a threshold. By tracking error counts for memory cells using the error cache 305 and switching ECC schemes from a relatively efficient ECC1 to a relatively robust ECC2 scheme based on the error count for an address satisfying a threshold, the system 300 may reduce a chance of adding a memory cell with a time-variant error to the error cache 305 (e.g., the threshold may help ensure that the error cache 305 includes memory cells with fixed defects, among other examples).

Although shown with two error correction engines 315 for illustrative clarity, it is to be understood that any quantity of ECC schemes or error correction engines 315 may be used. For example, the error correction engine 315-*a*, or no error correction engine 315, may be used if the error cache does not include an entry for an address 320. Alternatively, the error cache may include one or more entries for the address 320. For example, an entry may store an indication of the address 320 and a set of parity bits associated with a different ECC scheme (e.g., ECC2). In some examples, the error cache 305 may include multiple entries for the address 320 (e.g., multiple slots in the caching structure), each entry storing a set of parity bits. As illustrative examples, an address may correspond to two entries and store two sets of bits in the error cache 305 and a set of bits in the memory array 310 (e.g., an ECC3 scheme), the address may correspond to three entries and store three sets of bits in the error cache 305 and a set of bits in the memory array 310 (e.g., an ECC4 scheme), etc. Such parity schemes may each correspond to a respective error correction engine 315. Such adaptive parity schemes may enable the system 300 to represent a codeword of data multiple times in the error cache 305 for increasingly resilient encoding levels. For example, the parity bits in each entry, or slot within an entry, may be segments of a full set of parity bits (e.g., a full parity "string") for a given encoding scheme, such as ECC1, ECC2, ECC3, etc.

The system 300 may select an error correction engine 315-*a* in accordance with a quantity of hits for an address 320 (e.g., a quantity of matches to the address 320 in the error cache 305). For example, if there are no hits, the system 300 may encode or decode the data with the error correction engine 315-*a* (e.g., with a corresponding ECC scheme or with no ECC scheme), if there is a single hit the system 300 may encode or decode the data with the error correction 315-*b* (e.g., with a corresponding ECC scheme using relatively more parity bits than the error correction engine 315-*a*), if there are two hits the system 300 may encode or decode the data with an error correction 315-*c*

(e.g., with a corresponding ECC scheme using relatively more parity bits than the error correction engine 315-*b*), and so on. Such selection may enable the system 300 to implement different ECC schemes for different addresses of the memory array 310, which may increase error protection for pages with relatively frequent errors and reduce processing overhead for pages relatively free of errors, among other advantages.

Figure 4:
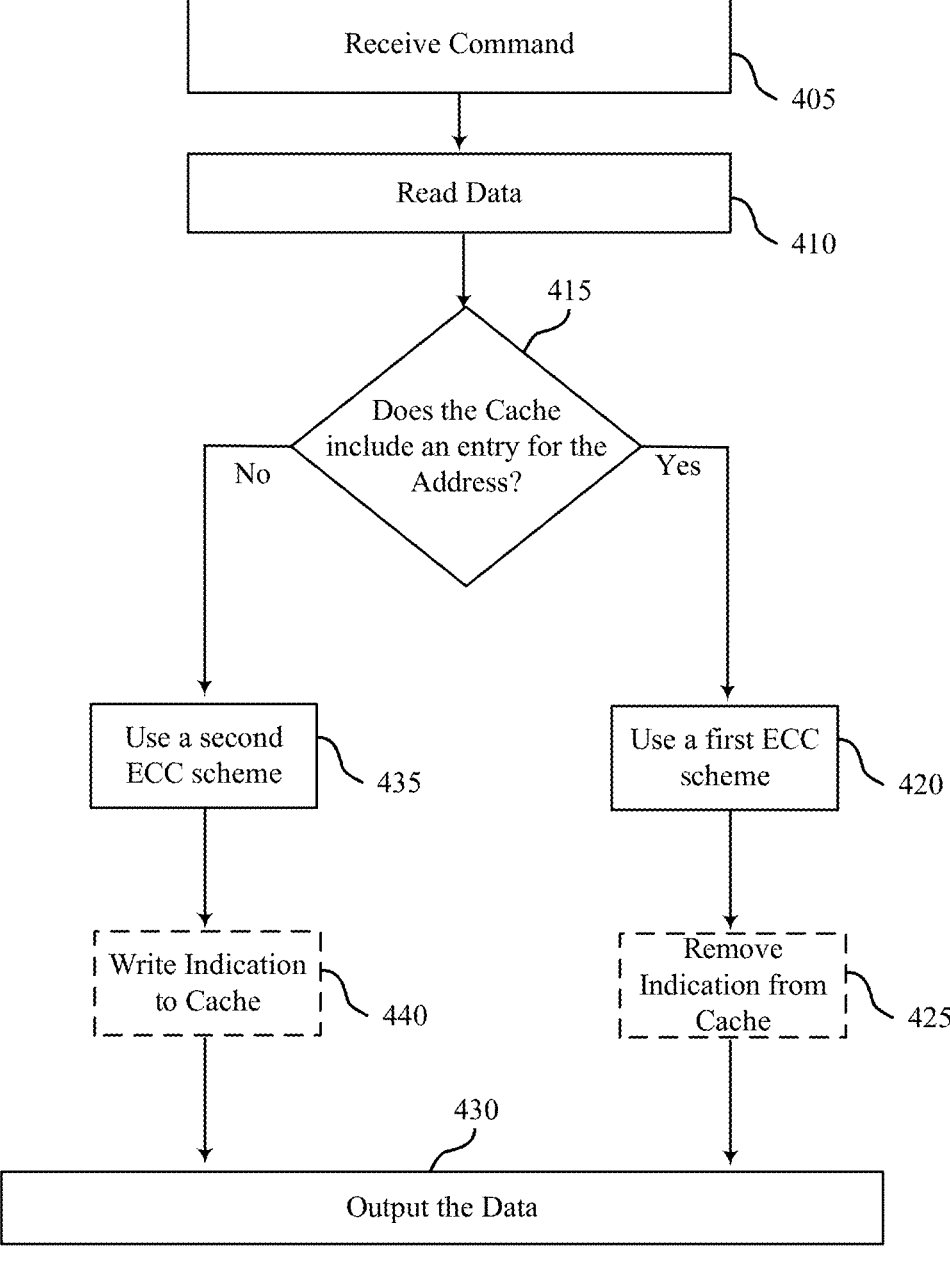
FIG. 4 illustrates an example of a process flow that supports adaptive parity techniques for a memory device in accordance with examples as disclosed herein.

FIG. 4 illustrates an example of a process flow 400 that supports adaptive parity techniques for a memory device in accordance with examples as disclosed herein. The process flow 400 may be an example of operations performed by a system 100, a memory device 110, or a system 300 as described with reference to FIGS. 1-3, respectively. Generally, the operations shown in FIG. 4 may illustrate procedures and operations of a memory device (or a memory system) to perform error correction procedures using an error cache and one or more ECC schemes, although it is to be understood that there may be more or less operations than shown. Additionally or alternatively, operations may be added, removed, or performed in a different order than shown in FIG. 4.

At 405, the memory device may receive a command. For example, the memory device may receive a read command from a host device. The command may indicate an address (e.g., a logical or physical address) for data that is to be read from a memory array within the memory device.

The memory device may use the address (e.g., as received or based on a logical-to-physical mapping to obtain a physical address) to access a memory array and check (e.g., query) an error cache of the memory device (e.g., a memory array 310 and an error cache 305 as described with reference to FIG. 3). For example, if the command received at 405 is a read command, at 410 the memory device may read data from the memory array based on the address indicated by the command. In some examples, the memory device may also read parity bits associated with the data from the memory array (e.g., if the data was stored in accordance with an ECC scheme that generates parity bits and stores them in the memory array in addition or alternative to parity bits for the data stored in the error cache).

At 415, the memory device may determine whether the cache includes an entry for the address (e.g., the memory device may determine whether the cache includes an entry for the indicated address or for an address mapped to the indicated address). For example, the memory device may query the error cache concurrent (e.g., in parallel) with reading the data and performing a first error checking procedure for the data using the parity bits. That is, a time period to search the error cache and provide any cached information for the address (e.g., submit a query to the error cache and return a result to an error correction engine) may be allocated such that the cached information (e.g., parity bits) is available to an error correction engine before an error correction procedure using the cached information is performed on the raw data.

In some examples, the memory device may determine that the address is located in the cache (e.g., the row address for the data may be in the table and the query result may return a hit for the address). At 420, the memory device may use a first ECC scheme to detect or correct errors in the data based on the cache including an entry for the address. For example, the memory device may check the data for errors using a set of parity bits stored in the error cache, a second set of parity bits stored in the memory array, or any combination thereof (e.g., parity bits generated for an ECC2 scheme and stored partially or completely in the error cache or the memory array, as described herein). Such a scheme may be relatively more robust, which may improve error correction and detection capabilities for addresses that are relatively likely to include errors.

In some examples, the memory device may detect and/or correct errors using the first ECC scheme and output the data at 430. In some other examples, the memory device may detect no errors in the data and proceed to output the data at 430. In some such examples, at 425 the memory device may remove an indication of the address from the cache based on detecting no errors in the data. For example, the memory device may increment a count of a quantity of times that an error was unable to be found and if the count satisfies a threshold, the memory device may remove the address and refrain from using the first error scheme for the address (e.g., the memory device may switch to the second ECC scheme and refrain from including the address or parity bits in the error cache).

In some examples, the memory device may determine that the address is not found in the cache (e.g., the row address for the data may not be in the table and the query result may return a miss for the address). At 435, the memory device may use a second ECC scheme (e.g., no ECC scheme or a default ECC scheme) to detect or correct errors in the data based on the cache lacking an entry for the address. For example, the memory device may check the data for errors using a set of parity bits stored in the memory array (e.g., parity bits generated for an ECC1 scheme as described herein with reference to FIG. 3). Such a scheme may be relatively efficient (e.g., the default scheme may use less parity bits and reduce a processing overhead, reduce storage usage of an error cache or a memory array, or both, among other advantages).

In some examples, the memory device may detect no errors in the data and proceed to output the data at 430. In some other examples, the memory device may detect and/or correct errors using the second ECC scheme and output the data at 430. In some such examples, at 440 the memory device may write an indication of the address to the cache based on detecting an error in the page (e.g., the address). For example, the memory device may increment a count of a quantity of times that an error was found and if the count satisfies a threshold, the memory device may write an indication of the address to the error cache and switch from the second ECC scheme to the first ECC scheme. As an illustrative example, the memory device may generate a set of parity bits for the first ECC scheme (e.g., a greater quantity of parity bits compared to the quantity of parity bits used for the second ECC scheme) and store at least a portion of the set of parity bits in the error cache, a portions of the set of parity bits in the memory array, or any combination thereof.

Although shown with two ECC schemes for illustrative clarity, it is to be understood that any quantity of ECC schemes or error correction engines may be used. For example, the error cache may include one or more entries for the address. An entry may store an indication of the address and a set of parity bits associated with a respective ECC scheme. In some examples, the error cache may include multiple entries for the address (e.g., multiple slots in the caching structure), each entry storing a set of parity bits. As illustrative examples, an address may correspond to two entries. The memory device may store a first set of bits in the memory array, and both a second set of bits and a third set of bits may be stored in the error cache (e.g., the first, second, and third set of parity bits may be a full set of parity bits for an ECC3 scheme), the address may correspond to three entries and store three sets of bits in the error cache 305 and a set of bits in the memory array (e.g., an ECC4 scheme), etc. Such parity schemes may each correspond to a respective error correction engine, as described with reference to FIG. 3. Such adaptive ECC schemes may enable the system to represent a codeword of data multiple times in the error cache for increasingly resilient encoding levels. For example, the parity bits in each entry may be portions of a full set of parity bits (e.g., a full parity "string") for a given encoding scheme, such as ECC1, ECC2, ECC3, etc.

The memory device may select an error correction engine based on a quantity of hits for an address (e.g., a quantity of matches to the address found in the error cache). For example, if there are no hits, the memory device may encode or decode the data with a first error correction engine (e.g., with a corresponding ECC scheme or with no ECC scheme), if there is a single hit the memory device may encode or decode the data with a second error correction engine (e.g., with a corresponding ECC scheme using relatively more parity bits than the first error correction engine), and so on. Such selection may enable the memory device to implement different ECC schemes for different addresses of the memory array, which may increase error protection for pages with relatively frequent errors and reduce processing overhead for pages relatively free of errors, among other advantages.

Figure 5:
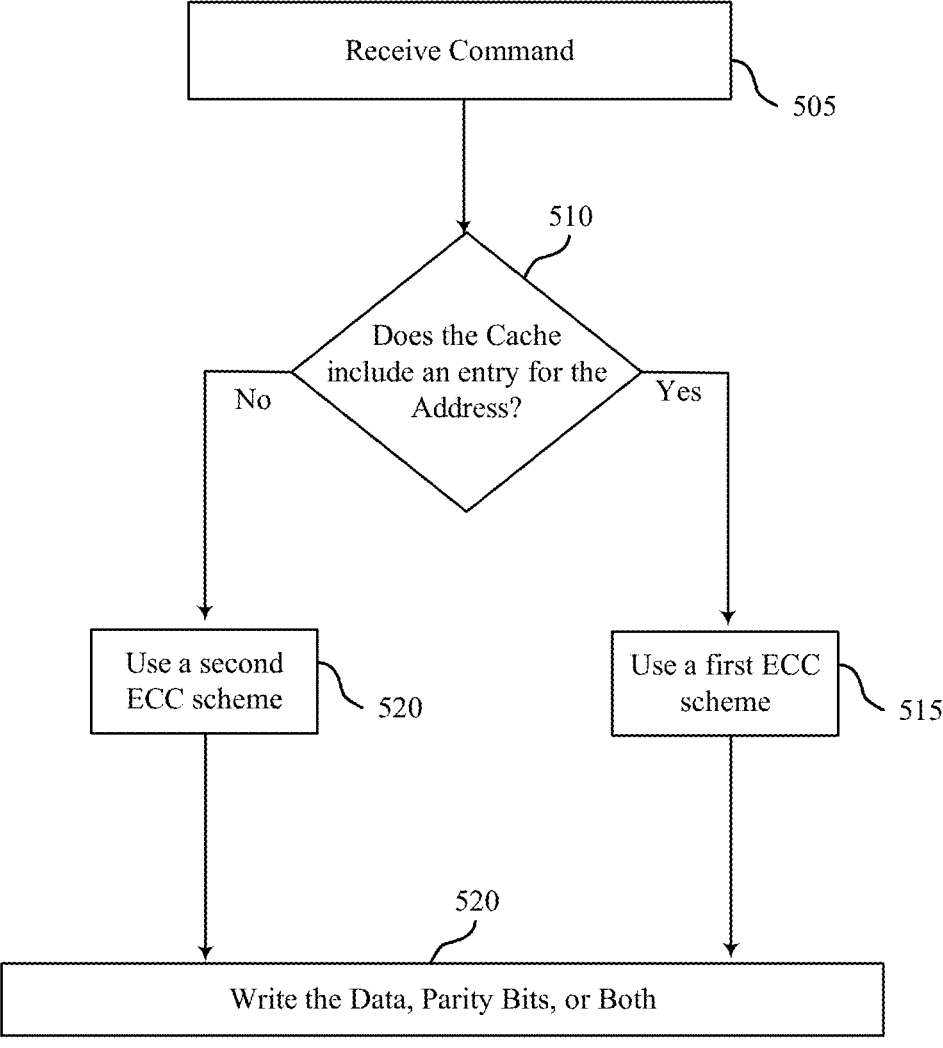
FIG. 5 illustrates an example of a process flow that supports adaptive parity techniques for a memory device in accordance with examples as disclosed herein.

FIG. 5 illustrates an example of a process flow 500 that supports adaptive parity techniques for a memory device in accordance with examples as disclosed herein. The process flow 500 may be an example of operations performed by a system 100, a memory device 110, or a system 300 as described with reference to FIGS. 1-3, respectively. Generally, the operations shown in FIG. 5 may illustrate procedures and operations of a memory device (or a memory system) to perform error correction procedures using an error cache and one or more ECC schemes, although it is to be understood that there may be more or less operations than shown. Additionally or alternatively, operations may be added, removed, or performed in a different order than shown in FIG. 5.

At 505, the memory device may receive a command. For example, the memory device may receive a write command from a host device. The command may indicate an address (e.g., a logical or physical address) for data that is to be written to a memory array within the memory device. The memory device may use the address (e.g., as received or based on a logical-to-physical mapping to obtain a physical address) to access a memory array and check (e.g., query) an error cache of the memory device (e.g., a memory array 310 and an error cache 305 as described with reference to FIG. 3).

For example, at 510 the memory device may determine whether the cache includes an entry for the address (e.g., the memory device may determine whether the cache includes an entry for the indicated address or for an address mapped to the indicated address). For example, the memory device may query the error cache to see if one or more entries associated with the address are included in the error cache.

In some examples, the memory device may determine that one or more entries for the address are located in the cache (e.g., the row address for the data may be in a table of the error cache and the query result may return a hit for the address). At 515, the memory device may implement a first ECC scheme based on the cache including the one or more entries for the address. For example, the memory device may generate a set of parity bits in accordance with the ECC scheme (e.g., the memory device may generate 18 parity bits as part of an ECC2 scheme as described herein, among other examples of quantities of bits and ECC schemes).

At 520, the memory device may write the data, the parity bits, or both to the memory array or the error cache. For example, the memory device may write the data to the indicated address of the memory array. The memory device may also store the generated set of parity bits in accordance with the ECC scheme. For example, the memory device may store a first portion of the generated bits (e.g., a first set of 9 bits) in the error cache with the indication of the address, the memory device may store a second portion of the generated bits (e.g., a second set of 9 bits) in the memory array with the data, or any combination thereof.

In some other examples, the memory device may determine that one or more entries for the address is not found in the cache (e.g., the row address for the data may not be in the table and the query result may return a miss for the address). At 520, the memory device may use a second ECC scheme (or no ECC scheme) based on the cache lacking the one or more entries. For example, the memory device may refrain from generating parity bits and proceed to write the data to the memory array at 520. As another example, the memory array may generate a set of parity bits in accordance with the second ECC scheme (e.g., a default ECC scheme such as ECC1 as described with reference to FIG. 3). The memory device may proceed to 520 and write the data and the generated parity bits in the memory array (e.g., the memory device may generate 9 parity bits as part of an ECC1 scheme and write the parity bits in the memory array with the data).

Although shown with two ECC schemes for illustrative clarity, it is to be understood that any quantity of ECC schemes or error correction engines may be used. For example, the error cache may include one or more entries for the address. An entry may store an indication of the address and a set of parity bits associated with a respective ECC scheme. In some examples, the error cache may include multiple entries for the address (e.g., multiple slots in the caching structure), each entry storing a set of parity bits. As illustrative examples, an address may correspond to two entries. The memory device may store a first set of bits in the memory array, and both a second set of bits and a third set of bits may be stored in the error cache (e.g., the first, second, and third set of parity bits may be a full set of parity bits for an ECC3 scheme), the address may correspond to three entries and store three sets of bits in the error cache 305 and a set of bits in the memory array (e.g., an ECC4 scheme), etc. Such parity schemes may each correspond to a respective error correction engine, as described with reference to FIG. 3. Such adaptive ECC schemes may enable the system to represent a codeword of data multiple times in the error cache for increasingly resilient encoding levels. For example, the parity bits in each entry may be portions of a full set of parity bits (e.g., a full parity "string") for a given encoding scheme, such as ECC1, ECC2, ECC3, etc.

The memory device may select an error correction engine based on a quantity of hits for an address (e.g., a quantity of matches to the address found in the error cache). For example, if there are no hits, the memory device may encode or decode the data with a first error correction engine (e.g., with a corresponding ECC scheme or with no ECC scheme), if there is a single hit the memory device may encode or decode the data with a second error correction engine (e.g., with a corresponding ECC scheme using relatively more parity bits than the first error correction engine), and so on. Such selection may enable the memory device to implement different ECC schemes for different addresses of the memory array, which may increase error protection for pages with relatively frequent errors and reduce processing overhead for pages relatively free of errors, among other advantages.

Figure 6:
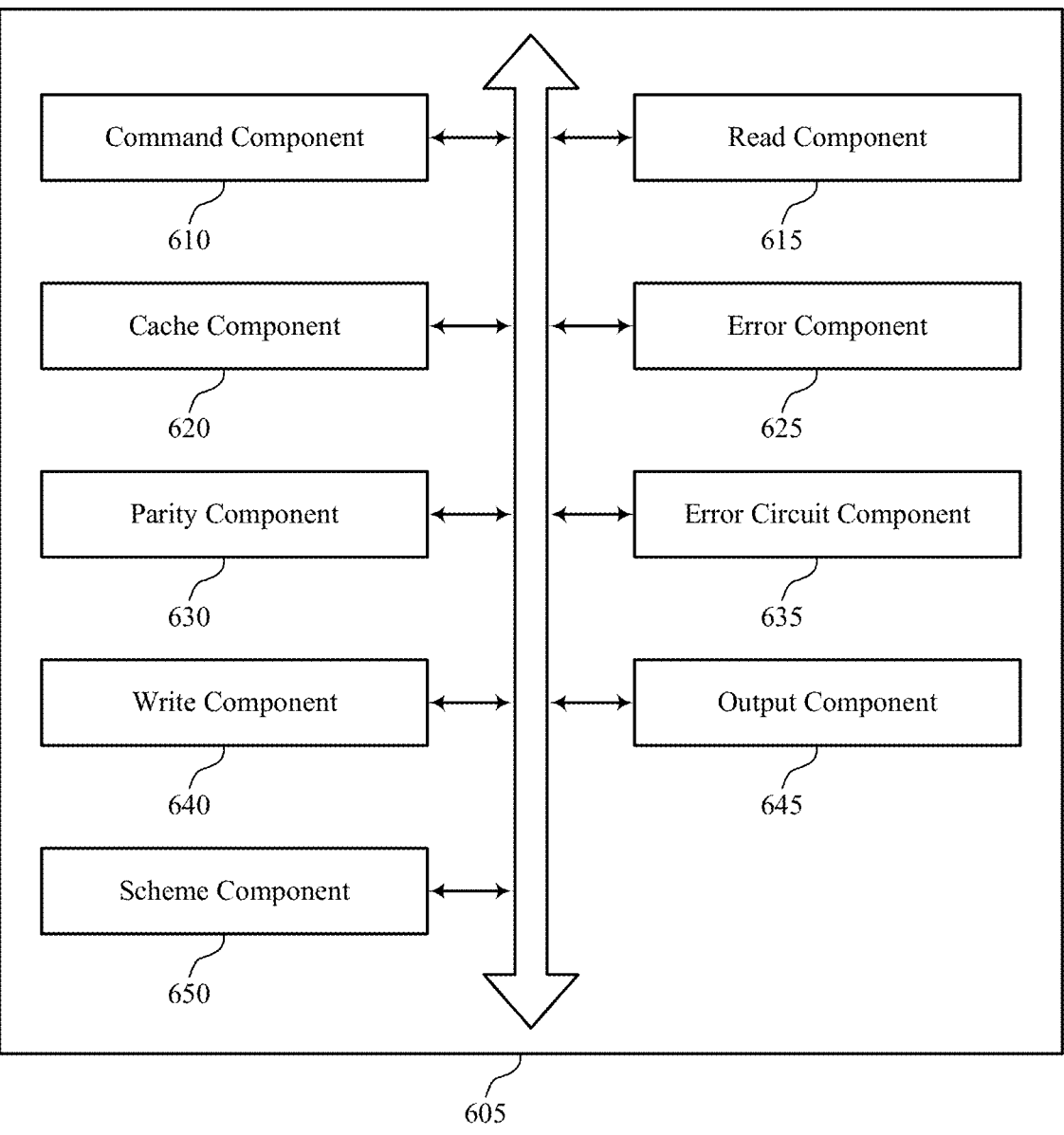
FIG. 6 shows a block diagram of a memory array that supports adaptive parity techniques for a memory device in accordance with aspects of the present disclosure.

FIG. 6 shows a block diagram 600 of a memory array 605 that supports adaptive parity techniques for a memory device in accordance with examples as disclosed herein. The memory array 605 may be an example of aspects of a memory array as described with reference to FIGS. 1-5. The memory array 605 may include a command component 610, a read component 615, a cache component 620, an error component 625, a parity component 630, an error circuit component 635, a write component 640, an output component 645, and a scheme component 650. Each of these modules may communicate, directly or indirectly, with one another (e.g., via one or more buses).

The command component 610 may receive a command to read data from a memory array, the command indicating an address associated with the data. The read component 615 may read the data from the memory array in response to the command. The cache component 620 may determine, based on the address, that a cache includes an indication of the address and a set of parity bits for the data. The error component 625 may check the data for one or more errors using the set of parity bits based on determining that the cache includes the indication of the address and the set of parity bits.

In some examples, the set of parity bits included in the cache may be a second set of parity bits for the data. The parity component 630 may read a first set of parity bits for the data from the memory array in response to the command, where checking the data for one or more errors using the set of parity bits includes checking the data for one or more errors using a combination of the first set of parity bits and the second set of parity bits. In some cases, the first set of parity bits supports detecting or correcting up to a first quantity of errors in the data. In some cases, the combination of the first set of parity bits and the second set of parity bits supports detecting or correcting up to a second quantity of errors in the data, the second quantity greater from the first quantity.

The error circuit component 635 may input the data, the first set of parity bits, and the second set of parity bits into a second error checking circuit coupled with the memory array and different than a first error checking circuit coupled with the memory array, where the second error checking circuit is configured to detect or correct up to a greater quantity of errors in the data than the first error checking circuit, and where checking the data for one or more errors is based on the inputting.

In some examples, the command component 610 may receive a second command to read second data from a memory array, the command indicating a second address associated with the second data. In some examples, the read component 615 may read, in response to the second command, the second data and a third set of parity bits for the second data from the memory array. In some examples, the cache component 620 may determine, based on the second address, that the cache includes no indication of the second address. In some examples, the error component 625 may check the second data for one or more errors using the third set of parity bits based on determining that the cache lacks the indication of the second address.

In some examples, the error component 625 may identify an error in the second data based on the checking using the third set of parity bits. In some examples, the parity component 630 may generate a fourth set of parity bits for the second data based on identifying the error in the second data. In some examples, the write component 640 may write, to the cache, an indication of the second address and the fourth set of parity bits.

In some examples, the error circuit component 635 may input the second data and the third set of parity bits into a first error checking circuit coupled with the memory array and different than a second error checking circuit coupled with the memory array, where the second error checking circuit is configured to detect or correct up to a greater quantity of errors in the data than the first error checking circuit, and where checking the second data for one or more errors is based on the inputting.

In some examples, the cache component 620 may obtain, from the cache, a third set of parity bits for the data in response to the command, where checking the data for one or more errors using the set of parity bits includes checking the data for one or more errors using a combination of the first set of parity bits, the second set of parity bits, and the third set of parity bits.

In some examples, the cache component 620 may determine, in response to the command, that a cache includes an indication of the address. In some examples, the error circuit component 635 may select, from a set of error checking circuits each coupled with the memory array, an error checking circuit based on the quantity of sets of parity bits, where checking the data for one or more errors using the set of parity bits includes inputting to the selected error checking circuit the data and each set of parity bits included in the cache for the data.

In some examples, the error component 625 may identify an error in the data based on the checking. In some examples, the error component 625 may correct the error using the set of parity bits. The output component 645 may output, by a memory device that includes the memory array, the corrected data in response to the command.

In some examples, the error component 625 may determine that no error is detected based on the checking. In some examples, the cache component 620 may remove, from the cache, the indication of the address and the set of parity bits based on determining that no error is detected.

In some cases, the cache includes a second memory array, a portion of the memory array, or a combination thereof. In some cases, the cache includes a set of entries each corresponding to a respective set of memory cells within the memory array, each respective set of memory cells including at least one defective memory cell, and each entry of the set including an indication of an address associated with the respective set of memory cells, parity bits for data associated with the respective set of memory cells, or a combination thereof.

In some examples, the command component 610 may receive a command to write data to a memory array, the command indicating an address associated with the data. The cache component 620 may determine, in response to the command, that a cache includes an indication of the address. The parity component 630 may generate a set of parity bits for the data based on determining that the cache includes the indication of the address. The write component 640 may write the data to the memory array and the set of parity bits to the cache.

In some examples, the set of parity bits written to the cache comprises a second set of parity bits for the data. In some examples, the parity component 630 may generate a first set of parity bits for the data. In some examples, the write component 640 may write the first set of parity bits to the memory array.

In some examples, the command component 610 may receive a second command to write second data to the memory array, the second command indicating a second address associated with the second data. In some examples, the cache component 620 may determine, in response to the second command, that the cache lacks an indication of the second address. In some examples, the parity component 630 may generate a third set of parity bits based on determining that the cache lacks the indication of the second address, the third set of parity bits including a same quantity of parity bits as the first set of parity bits. In some examples, the write component 640 may write the second data and the third set of parity bits to the memory array.

In some examples, the command component 610 may receive a third command to read the second data from the memory array, the third command indicating the second address. In some examples, the error component 625 may identify, in response to the third command, an error in the second data based on the third set of parity bits. In some examples, the parity component 630 may generate a fourth set of parity bits and a fifth set of parity bits based on identifying the one or more errors. In some examples, the write component 640 may write the fourth set of parity bits to the memory array and the fifth set of parity bits to the cache.

In some examples, the cache component 620 may determine, in response to the command, a quantity of indications included in the cache for the address. In some examples, the cache component 620 may determine, in response to the command and based on the address, a quantity of sets of parity bits included in the cache for the data. The scheme component 650 may select, from a set of parity schemes, a parity scheme for the data based on the quantity of indications included in the cache for the address, where generating the set of parity bits is based on selecting the parity scheme.

FIG. 7 shows a flowchart illustrating a method or methods 700 that supports adaptive parity techniques for a memory device in accordance with aspects of the present disclosure. The operations of method 700 may be implemented by a memory device or its components as described herein. For example, the operations of method 700 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 705, the memory device may receive a command to read data from a memory array, the command indicating an address associated with the data. The operations of 705 may be performed according to the methods described herein. In some examples, aspects of the operations of 705 may be performed by a command component as described with reference to FIG. 6.

At 710, the memory device may read the data from the memory array in response to the command. The operations of 710 may be performed according to the methods described herein. In some examples, aspects of the operations of 710 may be performed by a read component as described with reference to FIG. 6.

At 715, the memory device may determine, based on the address, that a cache includes an indication of the address and a set of parity bits for the data. The operations of 715 may be performed according to the methods described herein. In some examples, aspects of the operations of 715 may be performed by a cache component as described with reference to FIG. 6.

At 720, the memory device may check the data for one or more errors using the set of parity bits based on determining that the cache includes the indication of the address and the set of parity bits. The operations of 720 may be performed according to the methods described herein. In some examples, aspects of the operations of 720 may be performed by an error component as described with reference to FIG. 6.

In some examples, an apparatus as described herein may perform a method or methods, such as the method 700. The apparatus may include features, means, or instructions (e.g., a non-transitory computer-readable medium storing instructions executable by a processor) for receiving a command to read data from a memory array, the command indicating an address associated with the data, reading the data from the memory array in response to the command, determining, based on the address, that a cache includes an indication of the address and a set of parity bits for the data, and checking the data for one or more errors using the set of parity bits based on determining that the cache includes the indication of the address and the set of parity bits.

In some examples of the method 700 and the apparatus described herein, the set of parity bits included in the cache may include operations, features, means, or instructions for reading a first set of parity bits for the data from the memory array in response to the command, where checking the data for one or more errors using the set of parity bits includes checking the data for one or more errors using a combination of the first set of parity bits and the second set of parity bits.

In some examples of the method 700 and the apparatus described herein, the first set of parity bits supports detecting or correcting up to a first quantity of errors in the data, and the combination of the first set of parity bits and the second set of parity bits supports detecting or correcting up to a second quantity of errors in the data, the second quantity greater from the first quantity.

Some examples of the method 700 and the apparatus described herein may further include operations, features, means, or instructions for inputting the data, the first set of parity bits, and the second set of parity bits into a second error checking circuit coupled with the memory array and different than a first error checking circuit coupled with the memory array, where the second error checking circuit may be configured to detect or correct up to a greater quantity of errors in the data than the first error checking circuit, and where checking the data for one or more errors may be based on the inputting.

Some examples of the method 700 and the apparatus described herein may further include operations, features, means, or instructions for receiving a second command to read second data from a memory array, the command indicating a second address associated with the second data, reading, in response to the second command, the second data and a third set of parity bits for the second data from the memory array, determining, based on the second address, that the cache includes no indication of the second address, and checking the second data for one or more errors using the third set of parity bits based on determining that the cache lacks the indication of the second address.

Some examples of the method 700 and the apparatus described herein may further include operations, features, means, or instructions for identifying an error in the second data based on the checking using the third set of parity bits, generating a fourth set of parity bits for the second data based on identifying the error in the second data, and writing, to the cache, an indication of the second address and the fourth set of parity bits.

Some examples of the method 700 and the apparatus described herein may further include operations, features, means, or instructions for inputting the second data and the third set of parity bits into a first error checking circuit coupled with the memory array and different than a second error checking circuit coupled with the memory array, where the second error checking circuit may be configured to detect or correct up to a greater quantity of errors in the data than the first error checking circuit, and where checking the second data for one or more errors may be based on the inputting.

Some examples of the method 700 and the apparatus described herein may further include operations, features, means, or instructions for obtaining, from the cache, a third set of parity bits for the data in response to the command, where checking the data for one or more errors using the set of parity bits includes checking the data for one or more errors using a combination of the first set of parity bits, the second set of parity bits, and the third set of parity bits.

Some examples of the method 700 and the apparatus described herein may further include operations, features, means, or instructions for determining, in response to the command and based on the address, a quantity of sets of parity bits included in the cache for the data, and selecting, from a set of error checking circuits each coupled with the memory array, an error checking circuit based on the quantity of sets of parity bits, where checking the data for one or more errors using the set of parity bits includes inputting to the selected error checking circuit the data and each set of parity bits included in the cache for the data.

Some examples of the method 700 and the apparatus described herein may further include operations, features, means, or instructions for identifying an error in the data based on the checking, correcting the error using the set of parity bits, and outputting, by a memory device that includes the memory array, the corrected data in response to the command.

Some examples of the method 700 and the apparatus described herein may further include operations, features, means, or instructions for determining that no error may be detected based on the checking, and removing, from the cache, the indication of the address and the set of parity bits based on determining that no error is detected.

In some examples of the method 700 and the apparatus described herein, the cache includes a second memory array, a portion of the memory array, or a combination thereof.

In some examples of the method 700 and the apparatus described herein, the cache includes a set of entries each corresponding to a respective set of memory cells within the memory array, each respective set of memory cells including at least one defective memory cell, and each entry of the set including an indication of an address associated with the respective set of memory cells, parity bits for data associated with the respective set of memory cells, or a combination thereof.

FIG. 8 shows a flowchart illustrating a method or methods 800 that supports adaptive parity techniques for a memory device in accordance with aspects of the present disclosure. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the memory device may receive a command to write data to a memory array, the command indicating an address associated with the data. The operations of 805 may be performed according to the methods described herein. In some examples, aspects of the operations of 805 may be performed by a command component as described with reference to FIG. 6.

At 810, the memory device may determine, in response to the command, that a cache includes an indication of the address. The operations of 810 may be performed according to the methods described herein. In some examples, aspects of the operations of 810 may be performed by a cache component as described with reference to FIG. 6.

At 815, the memory device may generate a set of parity bits for the data based on determining that the cache includes the indication of the address. The operations of 815 may be performed according to the methods described herein. In some examples, aspects of the operations of 815 may be performed by a parity component as described with reference to FIG. 6.

At 820, the memory device may write the data to the memory array and the set of parity bits to the cache. The operations of 820 may be performed according to the methods described herein. In some examples, aspects of the operations of 820 may be performed by a write component as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for receiving a command to write data to a memory array, the command indicating an address associated with the data, determining, in response to the command, that a cache includes an indication of the address, generating a set of parity bits for the data based on determining that the cache includes the indication of the address, and writing the data to the memory array and the set of parity bits to the cache.

In some examples of the method 800 and the apparatus described herein, the set of parity bits written to the cache may include operations, features, means, or instructions for generating a first set of parity bits for the data, and writing the first set of parity bits to the memory array.

Some examples of the method 800 and the apparatus described herein may further include operations, features, means, or instructions for receiving a second command to write second data to the memory array, the second command indicating a second address associated with the second data, determining, in response to the second command, that the cache lacks an indication of the second address, generating a third set of parity bits based on determining that the cache lacks the indication of the second address, the third set of parity bits including a same quantity of parity bits as the first set of parity bits, and writing the second data and the third set of parity bits to the memory array.

Some examples of the method 800 and the apparatus described herein may further include operations, features, means, or instructions for receiving a third command to read the second data from the memory array, the third command indicating the second address, identifying, in response to the third command, an error in the second data based on the third set of parity bits, generating a fourth set of parity bits and a fifth set of parity bits based on identifying the one or more errors, and writing the fourth set of parity bits to the memory array and the fifth set of parity bits to the cache.

Some examples of the method 800 and the apparatus described herein may further include operations, features, means, or instructions for determining, in response to the command, a quantity of indications included in the cache for the address, and selecting, from a set of parity schemes, a parity scheme for the data based on the quantity of indications included in the cache for the address, where generating the set of parity bits may be based on selecting the parity scheme.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory array, a cache configured to store a set of entries each corresponding to a respective set of memory cells within the memory array, each entry of the set including an indication of an address associated with the respective set of memory cells, parity bits for data associated with the respective set of memory cells, or a combination thereof, and circuitry configured to cause the apparatus to receive a command to read data from the memory array, the command indicating an address associated with the data, read the data from the memory array in response to the command, determine, based on the address, whether the cache includes an entry associated with the address and a set of parity bits for the data, and check the data for one or more errors using the set of parity bits when the cache includes the entry associated with the address and the set of parity bits.

In some examples, the set of parity bits may be a second set of parity bits for the data when the cache includes the set of parity bits, and the circuitry may be further configured to cause the apparatus to read a first set of parity bits for the data from the memory array in response to the command, and check the data for one or more errors using the first set of parity bits when the cache does not include the entry associated with the address and the second set of parity bits.

In some examples, to check the data for one or more errors using the set of parity bits when the cache includes the indication of the address and the set of parity bits, the control circuitry may be configured to cause the apparatus to check the data for one or more errors using a combination of the first set of parity bits and the second set of parity bits.

Some examples of the apparatus may include a first error checking circuit coupled with the memory array and configured to detect or correct up to a first quantity of errors in the data, and a second error checking circuit coupled with the memory array and configured to detect or correct up to a second quantity of errors in the data, the second quantity greater than the first quantity. The circuitry may be further configured to cause the apparatus to select the first error checking logic when the cache does not include the entry associated with the address and the second set of parity bits, select the second error checking logic when the cache includes the entry associated with the address and the second set of parity bits, and input the data into the selected one of the first error checking logic or the second error checking logic to check the data for one or more errors.

In some examples, the control circuitry may be further configured to cause the apparatus to generate a third set of parity bits for the data in response to identifying an error based on the checking, and write the third set of parity bits for the data to the cache.

In some examples, the control circuitry may be further configured to cause the apparatus to receive a second command to write second data to a memory array, the command indicating a second address associated with the second data, determine, in response to the second command, that the cache includes an entry associated with the second address, generate a fifth set of parity bits for the second data and a sixth set of parity bits for the second data based on determining that the cache includes the entry associated with the second address, and write the second data and the fifth set of parity bits to the memory array and the sixth set of parity bits to the cache.

In some examples, the cache includes a second memory array, a portion of the memory array, or a combination thereof.

While certain examples herein may be explained with reference to DRAM memory cells, it is to be understood that the techniques and structures herein may be applied to memory devices that include any type of memory cells.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A memory device, comprising:
   one or more memory arrays;
   a cache comprising a plurality of entries indicating addresses of the one or more memory arrays; and
   one or more controllers coupled with the one or more memory arrays and the cache, and configured to cause the memory device to:
      receive a command to read data from the one or more memory arrays, the command indicating an address associated with the data;
      determine, based at least in part on receiving the command, whether the cache includes an entry indicating the address;
      read the data from the one or more memory arrays; and
      perform one or more error control processes on the data based at least in part on determining whether the cache includes the entry.

2. The memory device of claim 1, wherein the one or more error control processes comprise a first error control process and a second error control process, and wherein the one or more controllers are further configured to cause the memory device to:
   determine that the cache includes the entry associated with the address,
   wherein performing the one or more error control processes comprises performing the first error control process based at least in part on determining that the cache includes the entry.

3. The memory device of claim 2, wherein, to perform the first error control process, the one or more controllers are further configured to cause the memory device to:
   determine whether one or more errors are present in the data using a first set of parity bits stored in the cache or a second set of parity bits stored in the one or more memory arrays, or both.

4. The memory device of claim 1, wherein the one or more error control processes comprise a first error control process and a second error control process, and wherein the one or more controllers are further configured to cause the memory device to:
   determine that the cache does not include the entry associated with the address,
   wherein performing the one or more error control processes comprises performing the second error control process based at least in part on determining that the cache does not include the entry.

5. The memory device of claim 4, wherein, to perform the second error control process, the one or more controllers are further configured to cause the memory device to:

determine whether one or more errors are present in the data using a set of parity bits stored in the one or more memory arrays.

6. The memory device of claim 1, wherein the one or more error control processes comprise at least a first error control process and a second error control process, wherein the first error control process supports detecting or correcting up to a first quantity of errors in the data, and the second error control process supports detecting or correcting up to a second quantity of errors in the data, the second quantity less than the first quantity.

7. The memory device of claim 1, wherein the one or more controllers are further configured to cause the memory device to:

identify one or more errors in the data based at least in part on performing the one or more error control processes; and correct the one or more errors based at least in part on performing the one or more error control processes.

8. The memory device of claim 7, wherein the one or more controllers are further configured to cause the memory device to:

store the entry associated with the address to the cache based at least in part on identifying the one or more errors in the data and determining that the cache does not include the entry.

9. The memory device of claim 1, wherein the one or more controllers are further configured to cause the memory device to:

determine that no errors are present in the data based at least in part on performing the one or more error control processes.

10. The memory device of claim 9, wherein the one or more controllers are further configured to cause the memory device to:

remove the entry associated with the address from the cache based at least in part on determining that no errors are present in the data and determining that the cache includes the entry.

11. The memory device of claim 1, wherein the one or more controllers are further configured to cause the memory device to:

output the data based at least in part on performing the one or more error control processes.

12. A memory device, comprising:

one or more memory arrays;

a cache comprising a plurality of entries indicating addresses of the one or more memory arrays; and one or more controllers coupled with the one or more memory arrays and the cache, and configured to cause the memory device to:

receive a command to write data to the one or more memory arrays, the command indicating an address associated with the data;

determine, based at least in part on receiving the command, whether the cache includes an entry indicating the address;

perform one or more error control processes based at least in part on determining whether the cache includes the entry; and write the data to the one or more memory arrays based at least in part on performing the one or more error control processes.

13. The memory device of claim 12, wherein the one or more error control processes comprise a first error control process and a second error control process, and wherein the one or more controllers are further configured to cause the memory device to:

determine that the cache includes the entry associated with the address, wherein performing the one or more error control processes comprises performing the first error control process based at least in part on determining that the cache includes the entry.

14. The memory device of claim 13, wherein, to perform the first error control process, the one or more controllers are further configured to cause the memory device to:

generate a first set of parity bits and a second set of parity bits associated with the data;

store the first set of parity bits in the cache with the entry; and store the second set of parity bits in the one or more memory arrays.

15. The memory device of claim 12, wherein the one or more error control processes comprise a first error control process and a second error control process, and wherein the one or more controllers are further configured to cause the memory device to:

determine that the cache does not include the entry associated with the address, wherein performing the one or more error control processes comprises performing the second error control process based at least in part on determining that the cache does not include the entry.

16. The memory device of claim 15, wherein, to perform the second error control process, the one or more controllers are further configured to cause the memory device to:

generate a set of parity bits associated with the data; and store the set of parity bits in the one or more memory arrays.

17. A memory device, comprising:

one or more memory arrays configured to store data;

a cache comprising a plurality of entries associated with the data; and one or more controllers coupled with the one or more memory arrays and the cache, and configured to cause the memory device to:

perform one or more error control processes using the cache;

identify no errors are present in first data read from the one or more memory arrays based at least in part on performing the one or more error control processes; and remove, from the cache, one or more entries associated with the first data based at least in part on identifying no errors are present in the first data.

18. The memory device of claim 17, wherein, to remove the one or more entries, the one or more controllers are further configured to cause the memory device to:

remove, from the cache, one or more addresses associated with the first data based at least in part on identifying no errors are present in the first data.

19. The memory device of claim 17, wherein the one or more controllers are further configured to cause the memory device to:

read the first data from the one or more memory arrays, wherein performing the one or more error control processes is based at least in part on reading the first data.

20. The memory device of claim 17, wherein the one or more controllers are further configured to cause the memory device to:

increment a count based at least in part on identifying no errors are present in the first data, wherein the count is associated with a quantity of times that no errors are identified in data from the one or more memory arrays based at least in part on performing the one or more error control processes; and determine whether the count satisfies a threshold based at least in part on incrementing the count, wherein removing the one or more entries is based at least in part on determining that the count satisfies the threshold.

\* \* \* \* \*